Oct. 6, 1942.    J. P. ELLENBECKER    2,297,827
STONE CUTTING AND FINISHING MACHINE
Filed Aug. 3, 1940    6 Sheets-Sheet 2

Inventor
John P. Ellenbecker
By his Attorneys

Oct. 6, 1942.    J. P. ELLENBECKER    2,297,827
STONE CUTTING AND FINISHING MACHINE
Filed Aug. 3, 1940    6 Sheets-Sheet 3

Inventor
John P. Ellenbecker
By his Attorneys

Oct. 6, 1942.  J. P. ELLENBECKER  2,297,827
STONE CUTTING AND FINISHING MACHINE
Filed Aug. 3, 1940   6 Sheets-Sheet 4

Inventor
John P. Ellenbecker
By his Attorneys

Oct. 6, 1942.　　　J. P. ELLENBECKER　　　2,297,827
STONE CUTTING AND FINISHING MACHINE
Filed Aug. 3, 1940　　　6 Sheets-Sheet 6

Inventor
John P. Ellenbecker
By his Attorneys

Patented Oct. 6, 1942

2,297,827

UNITED STATES PATENT OFFICE 2,297,827

STONE CUTTING AND FINISHING MACHINE

John P. Ellenbecker, St. Cloud, Minn.

Application August 3, 1940, Serial No. 350,450

5 Claims. (Cl. 51—100)

My present invention provides a highly efficient stone cutting machine of a type wherein the cutting operation is controlled by a template; and, generally stated, is in the nature of an improvement on or modification of the machine disclosed and broadly claimed in my prior Patent No. 1,831,412 of date November 10, 1931, entitled "Automatic control for stone cutting and finishing machines," and further disclosed and claimed in my pending application entitled "Automatic control for stone cutting and finishing machines," S. N. 235,196, filed October 15, 1938. The present machine and the said prior machines, while especially designed for the cutting of stone, are capable of cutting or forming curved or various other surfaces in materials other than stone.

In the machine illustrated in the drawings and specifically described in my said prior patent, the stone was mounted on a truck arranged to travel on a suitable track; a template was mounted to travel with the truck and stone; the cutting tool, which was a grinding wheel, did not travel with the truck and template, but was mounted to move toward and from the stone being acted thereon by the grinding wheel; a template tracer, in the form of a wheel, was arranged to engage the template and be caused to rise and fall under the action of the template, but did not travel with the template nor with the carriage or carrying truck and the stone mounted on the latter.

It was not practicable to use the template as a direct means for controlling the movements of the heavy grinding wheel and its support toward and from the stone, and for that reason the said prior machine employed power means, such as an electric motor, to actually perform the said tracer-following movements of the grinding wheel, combined with electro-magnetic motor-actuating connections directly actuated or controlled by the template.

In the operation of the machine of my prior patent it was found that, due to slack in certain of the parts and to a time lag or loss in the movement of the stone from and back into engagement with the grinding wheel, there was a change in relation between the starting of the stone cutting action, in producing the reverse movement of the stone to and from the wheel or vice versa; and in my pending application, above identified, I provided means for correcting this defect.

In practice the stones cut by machines of the general character above described are usually large, and frequently are of very great bulk and weight, so that movements of the stone required a great deal of power; whereas, traveling movements of the grinding wheel or cutting tool required relatively less power. Moreover, these heavy stones when once properly located should be held in a fixed position throughout the complete cutting action.

In my present improved machine the stone does not travel, but is held in a fixed position; and the cutting tool, to wit, the grinding wheel, is arranged to travel back and forth over the face of the stone and to move toward and from the same, under the indirect control of a template, that is connected for traveling movement with the grinding wheel. The grinding wheel is mounted on a carriage arranged to travel on a guide rail or beam that is mounted for movements toward and from the stone. An electric motor is mounted on the said traveling carriage and has connections for rotating the grinding wheel. A reversible electric motor with driving connections is provided for moving the guide rail or beam and, hence, the grinding wheel toward and from the stone; and an independent electric motor wth driving connections is provided for causing the travel of the grinding wheel on its guide rail.

The reversible actions of the reversible electric motor to effect the movements of the grinding wheel toward and from the stone are controlled by an electro-magnetic control system that includes a template tracer preferably in the form of a wheel that is subject to the traveling action of the template.

In the usual or most common use of the machine the grinding wheel will be arranged to travel a more or less irregular path in a general horizontal direction and this movement may properly be designated as the travel movement of the cutter; and the movement of the cutter toward and from the face of the stone may be designated as the tracer movement inasmuch as it is controlled by the template and cooperating tracer. However, as an improved and novel feature of the present machine, an arrangement is provided whereby the traveling movement of the cutter or grinding wheel will be in a general vertical direction and the tracer movement of said cutter or grinding wheel will be in a general horizontal direction toward and from the stone. A simple and efficient means whereby the results just above noted are accomplished will be more fully disclosed and described in connection with the accompanying drawings.

In the accompanying drawings I have illustrated a machine or apparatus that has been put into actual commercial use and has been found highly efficient for the purposes had in view.

Referring to these drawings wherein like characters indicate like parts throughout the several views.

Figure 1:
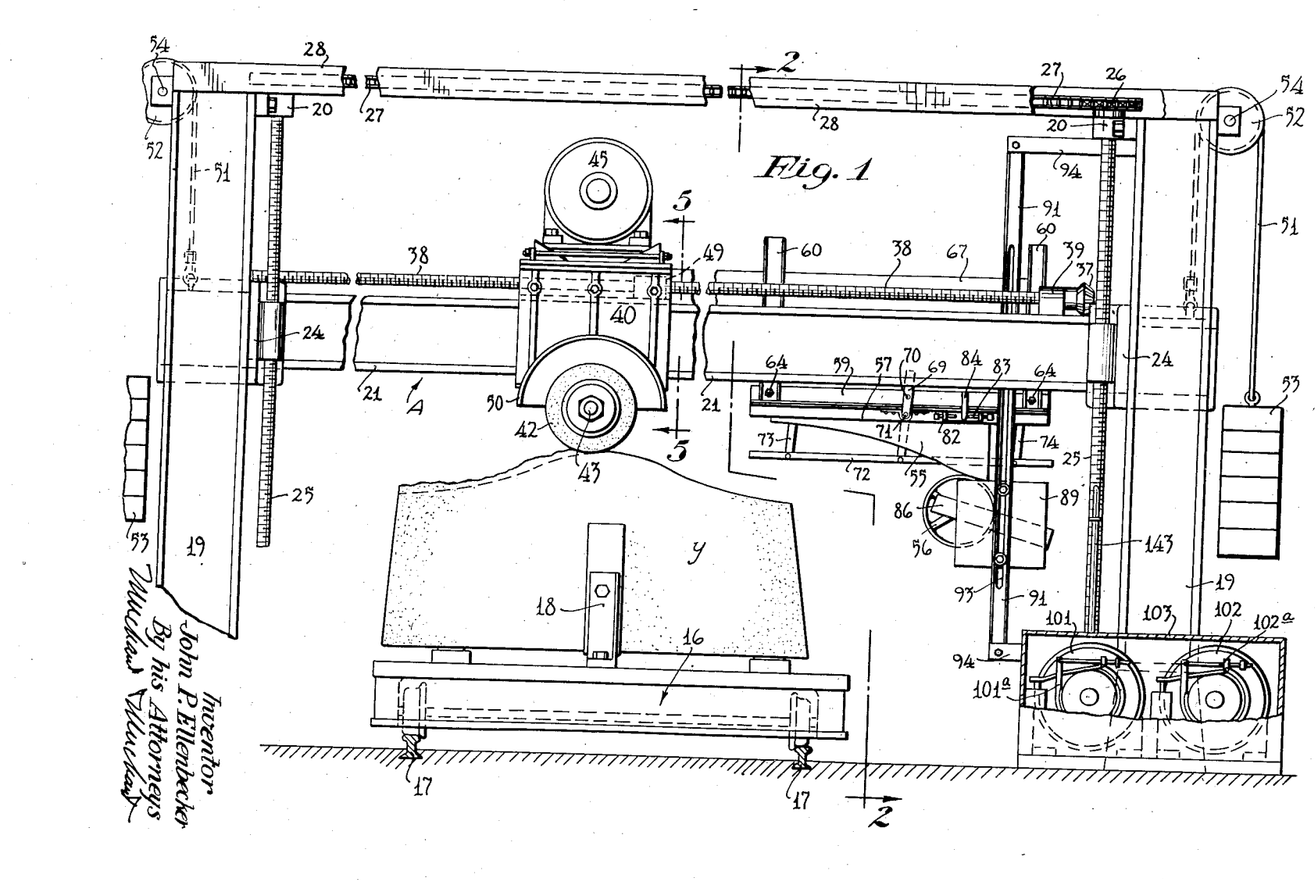
Fig. 1 is a side elevation showing the improved machine or apparatus looking at the same from the rear thereof, some parts being broken away and some parts being sectioned.

The stone that is being ground or cut, see particularly Fig. 1, is indicated by the character Y. This stone will be firmly held in a fixed position while it is being cut or ground, but, as illustrated, it is mounted on a truck 16 preferably arranged to travel on fixed rails 17. The stone, as shown, is anchored on the truck by brackets 18. When the stone is properly positioned, the truck will be anchored against accidental movements but may be moved from time to time to shift the stone laterally in respect to the wheel, when found desirable either because the grinding wheel is narrower than the stone or to cause even wearing away of the face of the wheel.

The supporting frame of the machine is shown as made up of four upright metal beams or corner posts 19 tied together at their upper ends by transverse and horizontal tie beams 20.

Mounted for vertical movements is a horizontally disposed supplemental frame indicated as an entirety in Figs. 1, 4, 5 and 12 by the character A and comprising parallel longitudinal beams 21 and 22 spaced and rigidly connected by interposed blocks or members 23. The outside beams 21, as will presently be noted, constitute guide rails for the traveling carriage. Rigidly secured to the four corners of the supplemental frame A, made up of said members 21, 22 and 23, are heavy guide blocks or heads 24 that are mounted to slide vertically on the four corner posts 19. The corner posts 19 at their lower ends will be anchored to the floor or foundation by any suitable means such as concrete footings. At the four corners of the framework are heavy upright screw-threaded rods 25 that are passed through and have threaded engagement with the nut-acting heads 24 of the supplemental frame. At their upper ends the four screw rods 25 are journaled in the ends of the beams 20 and are shown as provided with sprockets 26, the hubs of which act as thrust members on the upper surfaces of said beams. An endless sprocket chain 27 runs over the four sprockets 26 and connect the four screw rods 25 for simultaneous rotation. The chain 27, as shown, runs within a channel-shaped guard 28 secured on the top of the framework. At their lower ends the screw rods 25 are shown as passed through suitable supports such as fixed housings 29. The two screw rods 25 at one end of the framework are shown as provided with bevel gears 30 that cooperate with other bevel gears to be hereinafter described.

At one end of the framework is an upright driving shaft 31, the lower end of which is extended through and is journaled in a bearing 32 on the housing 29, and the upper end of which is journaled in one of the cross beams 20. At its lower end shaft 31 carries a bevel gear 33. At its intermediate portion shaft 31 is extended through and journaled in a bearing 34 secured to one of the beams 22, see particularly Fig. 13. Mounted on the intermediate portion of shaft 31 is a bevel pinion 35 that is driven by said shaft 31 but is made vertically movable thereon by a key or the like engageable with a keyway 36. Bevel pinion 35 meshes with a similar pinion 37 carried by one end of a horizontally extended screw-threaded shaft or rod 38 that is journaled in thrust bearings 39, on the opposite ends of the supplemental frame A.

The grinding wheel and electric motor for driving the same are on a carriage mounted to travel on the rails 21 of the supplemental frame A. This carriage, see particularly Fig. 5, is in the form of a strong rectangular metal frame 40 that embraces the supplemental frame A and has angular or L-shaped wearing strips 41 that directly engage the guide rails 21.

The grinding wheel 42 is carried by a shaft 43 journaled in bearings 44 on the bottom of the carriage 40. The shaft 43 and its grinding wheel 42 are rotatatively driven from an electric motor 45 mounted on the top of the carriage 40. The rotor of this motor 45 has a pulley 46 over which and a pulley 47 on shaft 43 runs a belt 48. The said pulleys and belt are preferably of the multiple type.

Figures 4, 5, 13:
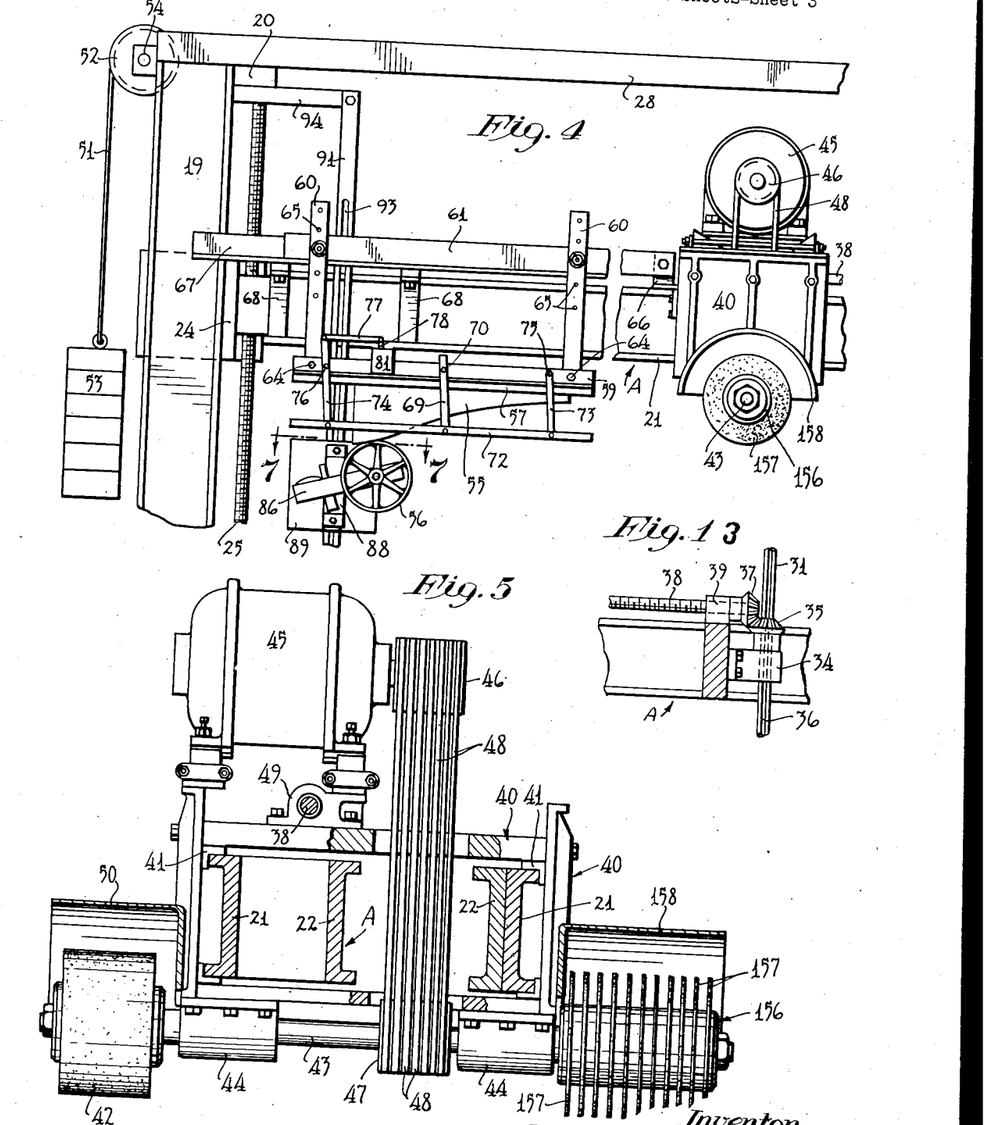
Fig. 4 is an elevation looking at the machine from the front side thereof, numerous parts being broken away.
Fig. 5 is a transverse section taken on the line 5—5 of Fig. 1.
Figure 13 is a detail in section taken on the line 13—13 of Figure 2.

Here it may be noted, see particularly Figs. 1 and 5, that the horizontal screw rod or shaft 38 is passed through and has threaded engagement with a nut-acting block 49 rigidly secured on the top of the carriage 40. In Figs. 1 and 5 the numeral 50 indicates an ordinary guard overlying the grinding wheel 42.

The weight of the supplemental frame and parts carried thereby is approximately counterbalanced; and, as shown, this is accomplished by cables 51 passed over guide pulleys 52 with their outer ends attached to heavy weights 53, and their inner ends attached to the respective guide heads 24. Pulleys 52, as shown, are journaled to bearings 54 on the four upper corner portions of the main framework.

Figure 6:
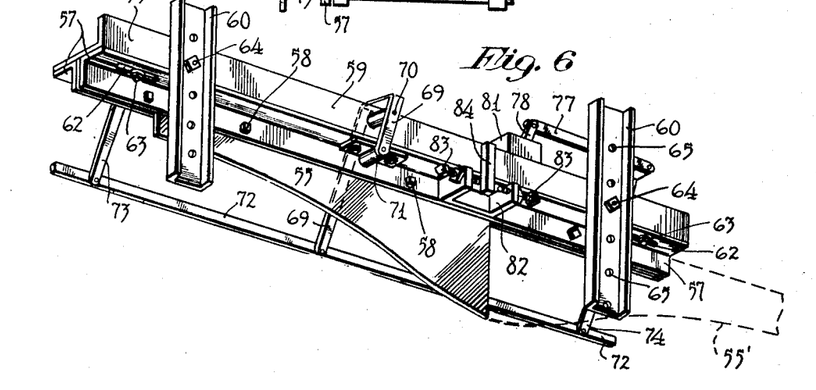
Fig. 6 is a view in perspective showing the template, the template-supporting vise and immediate associated parts removed from the machine.

In the machine illustrated, see particularly Figs. 1, 4 and 6, the template, which is in the form of a plate, is indicated by the numeral 55; and the template tracer, which is in the form of a wheel and is directly subject to the action of the template, is indicated by the numeral 56. This template, as shown, has a curved under surface that corresponds to one-half of the surface to be cut or ground on the stone, but in many cases will be a complete template representing the entire upper surface of the stone. This template is rigidly clamped between the depending flanges of a pair of angle bars 57, see particularly Fig. 6, by means of nut-equipped bolts 58, or the like. The upper flanges of the angle bars 57 are secured to the horizontal flange of a supporting and guiding beam 59, preferably an angle beam, which, in turn, is rigidly secured to vertical hanger bars 60 which, in turn, are rigidly secured to a traveling beam 61, see Fig. 4, which in turn is anchored to and caused to travel with the carriage 40.

The template 55 and the sliding angle bars 57 are connected for sliding movements in respect to the beam 59, by means of slots 62 in said angle bars 57 and cooperating devices such as nut-equipped bolts 63 depending from the beam 59. The beam 59 is rigidly secured to the hanger bars 60 but capable of vertical adjustments, by means of nut-equipped bolts 64 that work through perforations 65 in said hanger bars. To cause the beam 61 and all of the said parts hung therefrom to travel with the carriage 40, the front end of beam 61 is shown as rigidly attached to angle brackets 66, or the like, on the rear of said carriage. To support the extended portion of beam 61 for traveling movements with the carriage, it is shown as mounted on a flanged track or guide rail 67 which, in turn, is rigidly secured to the supplemental frame A by means of extended truss-like brackets 68, see particularly Figs. 2 and 4.

For imparting shifting movements to the sliding clamping bars 57 and the template 55 carried thereby, there is provided an inverted U-shaped shifting lever 69, see particularly Figs. 4 and 6, that is pivoted to the bar 59 at 70. The short arm of this lever 69 is pivotally connected at 71 to a hub on the depending flange of one of the slidable clamping bars 57. The long arm of this lever 69 is pivotally connected to a shifter bar 72 that is further supported by two link-like levers 73 and 74. The upper end of link 73 is pivoted to bar 59 at 75, see particularly Fig. 4, while the lever 74 is intermediately pivoted to said bar 59, at 76, and has an upper end that is connected, by a link 77, to the projecting arm 78 of a reversing switch shown diagrammatically in Fig. 11 and comprising fixed contacts 79 and movable contact 80. This reversing switch, as best shown in Fig. 6, is placed in a box 81 mounted on the traveling bar or beam 59. To adjustably limit the movements of the sliding clamping bars 57 and template 55 in respect to the traveling bar 59, there is shown a projecting stop bracket 82 on one of the shiftable bars 57 equipped with spaced stop screws 83 for engagement with a stop lug 84 on the said bar 59, as best shown in Fig. 6.

To adapt the device to cut or grind the complete face of a stone such as shown in Fig. 1 by reciprocating or traveling movements that carry the grinding wheel from the one end to the other of the stone, the template should be such as shown and marked 55 with an extension or continuation indicated by dotted lines on Fig. 6 and marked 55′.

Figures 7, 8, 9, 10:
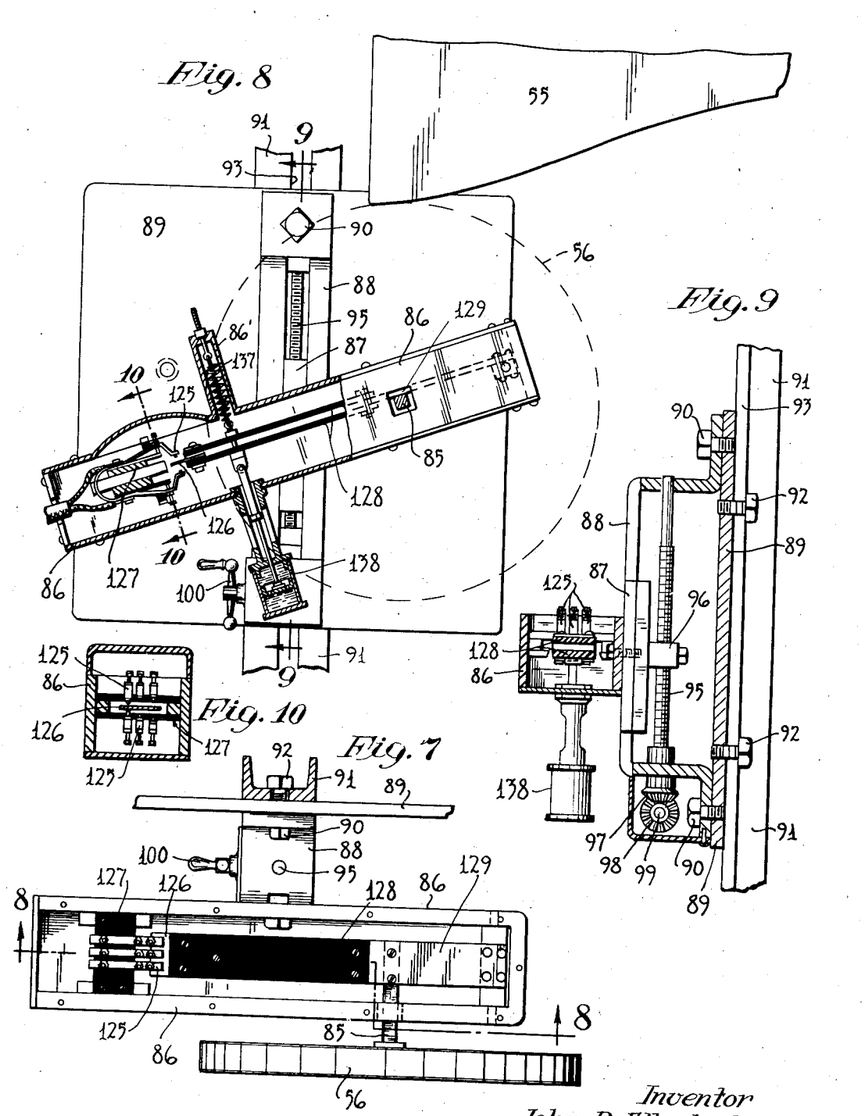
Fig. 7 is a detail chiefly in plan but with some parts in horizontal section on the line 7—7 of Fig. 4.
Fig. 8 is a view of the parts shown in Fig. 7 partly in side elevation and partly in section on the irregular line 8—8 of Fig. 7.
Fig. 9 is a vertical section taken approximately on the line 9—9 of Fig. 8.
Fig. 10 is a transverse section taken approximately on the line 10—10 of Fig. 8.

The tracer wheel 56, see particularly Figs. 1 and 8, is journaled at 85 to an elongated box-like casing 86 that is rigidly secured to a slide 87 mounted for vertical movements in a guide frame 88. This guide frame, as shown, is rigidly secured to a base plate 89 by suitable means such as machine screws 90. The base plate 89 in the structure illustrated is rigidly secured to an upright bar 91 by machine screws 92, see particularly Fig. 9, that work in a long vertical slot 93 of bar 91. The base plate 89, frame 88 and parts carried thereby, are made vertically adjustable by the slot 93 and screws 92. The bar 91, at its upper and lower ends, is rigidly connected to one of the corner posts 19 by horizontal arms or bars 94 that project from said corner posts.

For vertically adjusting the slide 87 and parts carried thereby, a vertical screw-rod 95 is supported by and swiveled in the upper and lower portions of frame 88 and has threaded engagement with a nut block 96 rigid on the inner face of said slide 87, as best shown in Fig. 9. At its extreme lower end, screw-rod 95 has a bevel pinion 97 that meshes with a similar pinion 98 carried by a stub shaft 99 equipped at its outer end with an operating crank 100, shown only in Fig. 8.

The power for producing the above noted travel movement and tracer movement of the grinding wheel is afforded by two reversible electric motors 101 and 102 shown as placed within a fixed casing 103. The rotor of motor 101 is connected to a shaft 104 through reduction gearing of conventional construction located within a gear box 105. Shaft 104 is journaled in suitable bearings 106, secured on the base of the main frame and, as shown, located under the housing 29. Rotatively mounted on the shaft 104 is a tubular shaft 107, see particularly Figs. 2 and 3, which at one end is provided with a gear 108 that meshes with a pinion 109. The rotor of motor 102 is connected to pinion 109 through reduction gearing of conventional construction located within a gear box 110.

Slidably mounted on the tubular shaft 107 is a sleeve 111 which, by a spline or key, is caused to rotate with said tubular shaft. At one end, sleeve 111 is provided with a bevel gear 112 that is adapted to mesh with pinion 30 of one of the screw rods 25; and at its other end, said sleeve is provided with a bevel gear 113 that is adapted to mesh with pinion 33 of shaft 31.

The electric motors 101 and 102 may be of any reversible variable speed type for either direct or alternating current of standard voltage and frequency. In the drawings said motors are illustrated as three phase alternating current motors of the slip ring type in which the brake mechanisms thereof are indicated respectively by the characters 101a and 102a.

Figure 11:
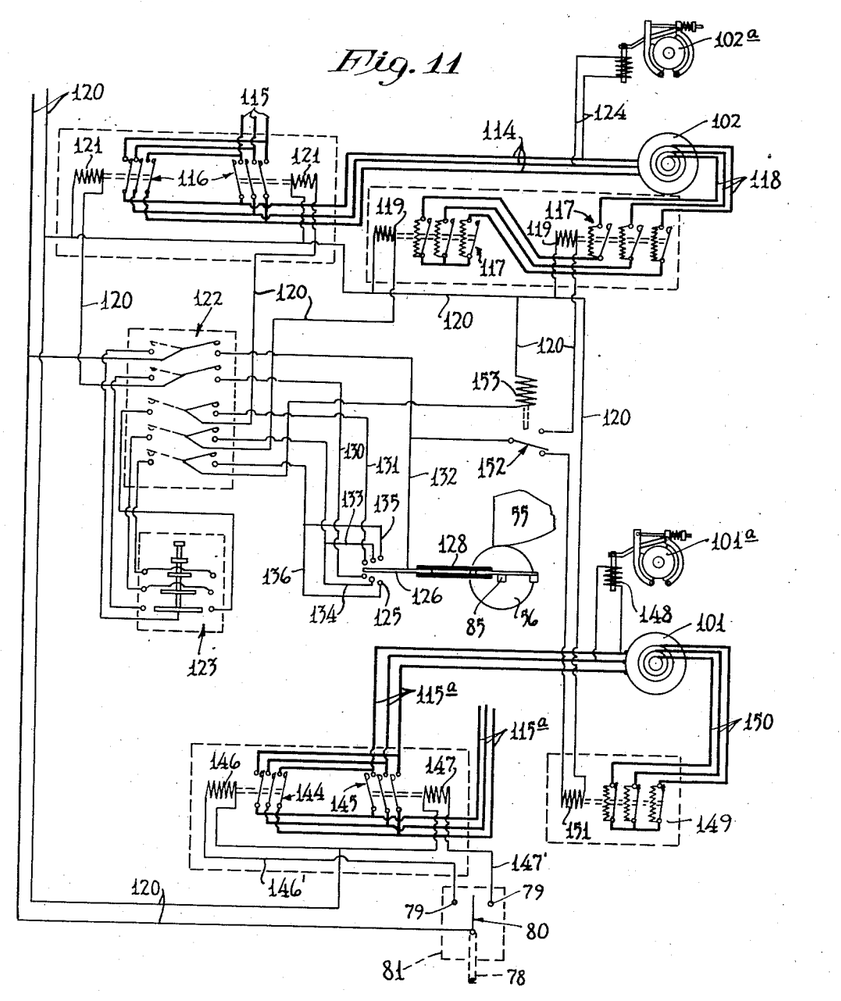
Fig. 11 is a diagram illustrating the electromagnetic template actuated controlling system.

The lead wires 114 of motor 102 are connected to power supply wires 115, see diagram view Fig. 11, by a magnetic reversing switch 116, and the speed of said motor is controlled by a series of resistances 117, as shown two, in an induced secondary three phase circuit 118 that leads from the motor 102. Two relays 119 in a circuit 120 of lower voltage than the power circuit 115, are provided for shunting the current around one or both resistances 117, to increase the speed of motor 102. Two electric magnets 121 in the circuit 120 are provided for operating the reversing switch 116; and interposed in said circuit is a hand-operated double-throw multiple switch 122 for manually controlling the reversing switch 116. When said double-throw switch is in a neutral position, the reversing switch 116 will be open. Also interposed in circuit 120 is a hand controller 123 for closing the circuit 120, to energize either one of the magnets 121 for reversing motor 102 and to energize either one or both of the relays 119, for shunting the circuit around either one or both resistances 117 to vary the speed of the motor 102.

It has already been indicated and may be here further stated in advance, that the motor 102 in the arrangement so far described, is the one that, under electro-magnetic control, affords the power to move the carriage and grinding wheel vertically or toward and from the stone.

The automatic brake 102a for motor 102 is in a shunt circuit 124 connected across the circuit 114. As is well known, this type of brake will automatically release when the motor circuit is closed by reversal of switch 116 and will set when said circuit is open, thus preventing motor 102 from being operated by momentum.

Referring now in detail to the automatic differentially-acting controlling device, the numeral 125 indicates a plurality of spaced relatively fixed contacts, and the numeral 126 indicates a co-operating movable contact. The said fixed contacts 125 are arranged in two series cooperatively located one on each side of neutral position of the movable contact 126. These contacts 125 and 126 are mounted in the box or enclosing frame 86 which, as previously described, is carried by a vertically movable slide 87 in frame 88, so that said box can be adjusted to proper initial position.

The upper and lower sets of contacts 125 are secured to a pair of vertically spaced members 127 of insulating material such as wood fiber, and the ends of which are secured to the box 86.

The two series of fixed contacts 125 are spaced the one from the other, with the movable contact 126 extended horizontally therebetween. This movable contact 126, as shown, is in the form of a flat finger rigidly secured to and between a pair of spaced insulating members 128, which, in turn, are rigidly secured to the outer end of a horizontal arm 129 pivoted to the casing 86 for vertical movement to carry the movable contact 126 into engagement with the contacts 125 of either series.

It is important to note, by reference to Figs. 8, 10 and 11, that the movable contact 126, when in neutral position, is midway between the two series of contacts 125 and out of contact therewith. It is also important to note that the contacts 125 of each series are successively and progressively farther away from neutral position of the movable contact 126, reading from the left toward the right in respect to Figs. 10 and 11. Each contact 125 is yieldingly pressed toward the movable contact 126 by a coiled spring, not shown, or by the spring tension in the contacts themselves. The structure just above described is also disclosed and described in my prior patent above identified.

The two left-hand contacts 125 are provided for closing the circuits for the reversing switch 116 and connected, the lower one by a wire 130 to the switch 122, and the upper one by a wire 131 to said switch 122; and the movable contact 126 is connected by a wire 132 to said switch 122. When the movable contact 126 is in engagement with the lower left-hand contact 125, the circuit 120 is closed, energizing the left-hand magnet 121 which operates the switch 116 to reverse the motor 102 for movement in a direction to elevate the grinding wheel 42 under the indirect action of the tracer wheel 56 on template 55. A reverse or upward movement of the movable contact 126 will engage the upper left-hand contact 125, close the circuit 120, energizing the right-hand magnet 121 which operates the switch 116 to reverse the motor 102 for rotation in the proper direction to lower the grinding wheel 42.

The two intermediate contacts 125 are connected to the switch 122, the upper one by a wire 133 and the lower one by a wire 134, and when the movable contact 126 is in engagement with either one of the said intermediate contacts, the left-hand relay 119 will be energized and operated to shunt the circuit around the left-hand resistance 117, thereby causing the motor 102 to operate at intermediate speed. Wires 135 and 136 connect the upper and lower right-hand contacts 125 respectively to the switch 122. When the movable contact 126 is engaged with either one of these right-hand contacts 125, the circuit 120 will be closed and the right-hand relay 119 energized and operated to shunt the circuit around the right-hand resistance 117, thereby causing the motor 102 to operate at high speed. It will be understood that when the movable contact 126 is in engagement with either one of the left-hand contacts 125, the motor 102 will operate at low speed, and when said movable contact is moved into engagement with either one of the intermediate contacts 125, the engaged left-hand contact 125 will yield to permit such movement and, likewise, the engaged intermediate contact 125 will yield to permit the movable contact 126 to engage one of the right-hand contacts 125.

The movable contact 126 is automatically operated by the tracer wheel 56 and cooperating template 55. In this arrangement the tracer wheel runs against the under edge of the template 55, and the downwardly pressed movement of the tracer wheel, and parts subject thereto, cause the grinding wheel to be raised in an order that corresponds to the curve or line of the template 55.

A counter-balancing spring 137 is adjustably anchored to a projection 86' and to the intermediate portion of movable contact arm 128 from which, of course, said spring is insulated. To steady the actions of movement of contact 126 and prevent vibrations thereof, there is provided a dashpot 138 held in suspension from the box 86, and its piston rod is attached to but insulated from the movable contact arm 128.

In practice the template 55 will usually be laid out or cut in the drafting or designing room, to represent the serpentine or other irregular surface to be cut on the face of the stone.

Figures 2, 3:
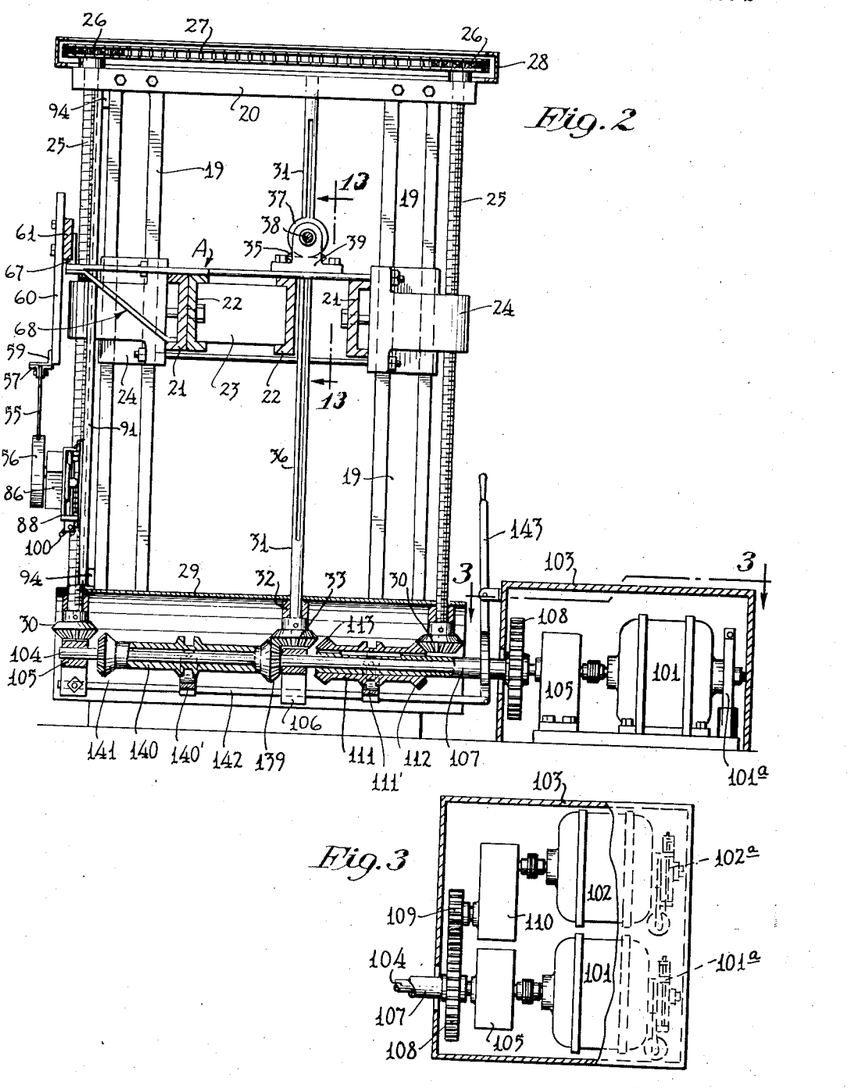
Fig. 2 is a transverse vertical section taken through the machine substantially on the irregular line 2—2 of Fig. 1.
Fig. 3 is a detail in horizontal section taken substantially on the line 3—3 of Fig. 2.

Directing attention now to Fig. 2, it will be noted that the shaft 104, which is driven from motor 101, is provided with a bevel gear 139 that meshes with the gear 33. So far as the machine so far described is concerned, this gear 139 could be fixed to said shaft 104; but for another reason, hereinafter to be noted, said gear is secured to one end of a sleeve 140 that is keyed to slide on but rotate with said shaft 104. Furthermore, for an important purpose, hereinafter to be noted, sleeve 140 is provided with a bevel gear 141 that is out of mesh with but adapted to be engaged with the bevel gear 30 that is just at the left of said gear 141, as shown in Fig. 2. At this point it may be further noted that the gear-equipped sleeves 111 and 140 are provided with annular grooves that are engaged by shipper forks 111' and 140' both connected to a common shipper bar 142, one end of which is connected to a lever 143 shown as pivoted to the housing 103, see Fig. 2.

The motor 101 is shown as applied with a three phase current through line or live wires 115a, through magnetic reversing switches 144 and 145 that are respectively subject to magnets 146 and 147. Magnets 146 and 147 are connected by wires 146' and 147' respectively to the left-hand and right-hand contacts 79 of the reversing switch. The movable contact 80 of this reversing switch is connected to one of the live wires 120, and the wire 147' is connected to the other lead wire 120 already noted.

The electro-magnetic brake 101a of motor 101 is subject to an electro-magnet 148 connected across the wires 115a.

The speed of motor 101 is controlled by a multiple resistance device 149 in induced secondary three phase circuit 150 that leads from motor 101. The movable elements of resistance 149 is subject to an electro-magnet 151 that is connected in extensions of low tension circuit 120. In one of the leads of circuit 120 is a switch 152 that is normally closed by gravity, or otherwise, but is subject to an electro-magnet 153 in a shunt 129' connected across the circuit 120.

Under the conditions illustrated in Fig. 11, the movable elements of resistance 149 will give a relatively free flow of current, but when the movable element of switch 152 is raised by magnet 153, the movable elements of resistance 149 will move to positions to shunt the high resistances of circuit 159; and, at the same time, the magnets 119 will be energized.

At the extreme traveling movements of the carriage and grinding wheel, the bar 72 will be moved so as to cause the template and its clamping bars 57 to slide on the traveling beam 59, and thereby compensate for the lag or play in the mechanism. In this particular machine the above correcting movement is designed to be accomplished manually by engagement of the bar 72; whereas, in my pending application, a similar correcting movement was accomplished automatically.

*Operation of machine so far described*

The operation of the machine above described is probably made quite clear from the foregoing, but may be briefly summarized as follows.

The stone, whether mounted on a truck, or otherwise, will be fixed in a local position, and the sleeves 111 and 140 will be adjusted as shown in Fig. 2. With this adjustment the power of motor 101 will be rendered operative through gears 139—33, shaft 36, bevel gears 35—37 and screw shaft 38, see particularly Fig. 13, to impart traveling movements to the carriage 40 and grinding stone 42 on the rail or truck afforded by the horizontal beams 21. This movement is now designated as the traveling movement.

At the same time the power of motor 102 will be transmitted through sleeve 111, gears 112—30 and the upright screw rods 25, to impart vertical movements to the said beams 21 and, hence, to the carriage and grinding wheel and other parts carried thereby. This vertical movement of the grinding wheel is now designated as the tracer movement which, in this particular instance, is a vertical movement either upward or downward according to the action of the electro-magnetic control system or device.

When the tracer calls for extreme movements of the grinding wheel either upward or downward, the movable contact 126 will engage with one or the other of the right-hand contacts 125 of Fig. 11; and some times when this occurs, the speed and power of the grinding wheel will not be sufficient to perform the maximum grinding action. To correct this defect I provide additional devices which I designate as safety correcting devices, see particularly Fig. 11, which involve the above described elements 149, 150, 152 and 153. This safety correcting device, as already indicated, retards the advance movement of the grinding wheel when it would otherwise be called upon to do work that it could not perform. Otherwise stated, it slows up the advance movement of the grinding wheel to a speed that the grinding wheel can cut its way on the stone, and also keeps the grinding wheel from cutting into the stone on a path not laid out or controlled by the design of the template.

*Travel and tracer movement converting means*

By quite simple and highly efficient means I provide a device whereby the hitherto described horizontal travel movement may be converted into a vertical travel movement; and the hitherto described vertical tracer movement may be converted into approximately horizontal tracer movement. This is accomplished in quite a simple way.

Figure 12:
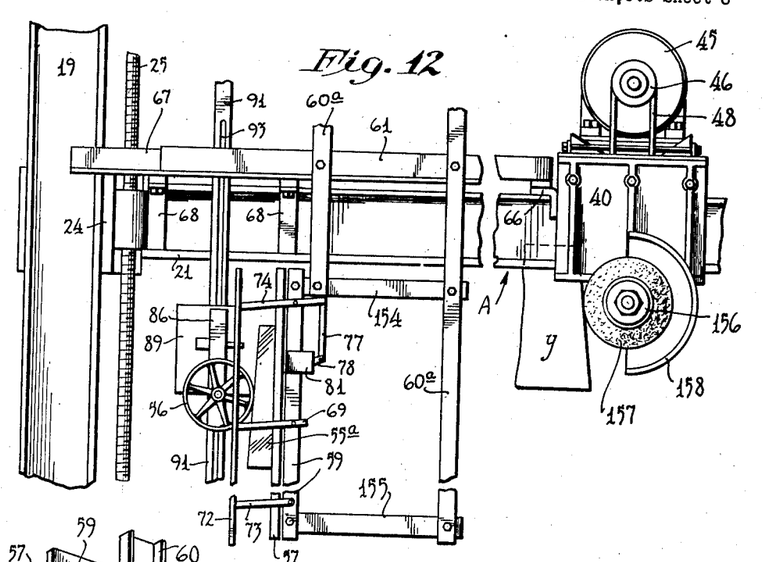
Fig. 12 is a view corresponding to Fig. 4 but illustrating a modified arrangement or adjustment of the machine for grinding away or cutting substantially vertical surfaces of the stone.

The assembly, made up of the heretofore described elements 56, 59, 72, 73, 74, 77, 78, 81, 86 and 89, is removed from the heretofore described machine and turned from an approximately horizontal position into an approximately vertical position and supported, as shown in Fig. 12, by suitable means that cause the same to travel with the carriage 40.

In lieu of the hanger bars 60 a pair of hanger bars 60a are rigidly secured to the movable bar 61, and the bar 59 is rigidly secured to the hanger bars 60a, and, hence, to the movable bar 61 by beams of cross tie bars 154 and 155. The template here shown is provided with a straight edge, but may be otherwise formed as indicated by the character 55a, and is clamped and held by the vise-acting angle bars 57.

In this modified arrangement the transposed assembly will be given vertical movements with the rail beams 21 and will be given horizontal movements with the carriage and grinding wheel. Otherwise stated, this transposed arrangement adapts the machine to cut various substantially vertical or upright surfaces, for example, on the sides or ends of the stone, and without changing the position of the stone.

For this modified action the sleeves 111 and 140 are, by manipulation of lever 143, moved toward the left in respect to Fig. 2 so as to disengage gear 112 from right-hand gear 30 and gear 139 from gear 33; and at the same time to engage gear 113 with gear 33 and gear 141 with left-hand gear 30. The effect of this is to cause the motor 102, which is electro-magnetically controlled, to impart horizontal movements to the carriage 40 and grinding wheel 42; and to cause motor 101 to impart vertical movements to the supplemental frame including the rails 21, and to the carriage and grinding wheel. It will thus be seen that by the shifting of the gears described, motor 102, which in the first adjustment imparted vertical tracer movements to the grinding wheel, now imparts to said grinding wheel horizontal tracer movements; and that the motor 101, which in the earlier adjustments imparted horizontal travel movements to the grinding wheel, now will impart vertical traveling movements to said carriage and grinding wheel. In this preferred arrangement the transposing of the actions of the motors is performed mechanically by gear and clutch mechanism, but might be otherwise performed. However, the arrangement described is very desirable and highly efficient and of relatively small cost.

My invention also contemplates a further improvement which facilitates the initial work of roughing out the surface of the stone to approach somewhat closely the desired finished surface. For this purpose the motor-driven shaft 43 is provided at one end, to wit, at its right-hand end as shown in Fig. 5, with a hub 156 that carries a plurality of spaced cutting discs 157 which, as shown, in Fig. 5, are covered by a hood 158 that constitutes no special part of the invention, but, as shown, is secured to one side of the carriage 40.

The drawings of this application illustrate the commercial machine, the operativeness and practicability of which has been thoroughly demonstrated; the said machine, including the drawings, has been described in detail. However, it will be understood that while I have illustrated one form of the machine and described the same, the invention involved is capable of various modifications within the scope of the invention disclosed and broadly claimed.

What I claim is:

1. In a machine of the kind described, a work support and a cutter support, means for imparting reciprocating traveling movements to one of said supports in respect to the other, a cutter mounted for vertical movements on said cutter support, a template mounted for traveling movements with the traveling support and extending in the direction of the line of travel, a tracer engageable with said template and arranged to be raised and lowered under traveling movements of said movable support, power means controlled by said tracer movements to cause movements of said cutter toward and from the work according to the design represented by said template, said template being free for limited sliding movements in the direction of its travel, and stop means set to limit the endwise sliding movements of said template in respect to said movable support, to an extent that compensates for the predetermined slack and lag in the power mechanism, and a manually engageable template shifting device operative at will at the reversal of the traveling movements of said movable support.

2. In a machine of the kind described, a work support and a cutter support, means for imparting reciprocating traveling movements to one of said supports in respect to the other, a cutter mounted for vertical movements on said cutter support, a template mounted for traveling movements with the traveling support and extending in the direction of the line of travel, a tracer engageable with said template and arranged to be raised and lowered under traveling movements of said movable support, power means controlled by said tracer movements to cause movements of said cutter toward and from the work according to the design represented by said template, said template being free for limited sliding movements in the direction of its travel, and stop means set to limit the endwise sliding movements of said template in respect to said movable support, to an extent that compensates for the predetermined slack and lag in the power mechanism, at the reversal of the traveling movements of said movable support, said stop means involving an adjustable stop element, whereby the sliding movements of said template in respect to said movable support may be accurately adjusted to the predetermined slack and lag in the power mechanism, and manually engageable template shifting device operative at will to shift said template as indicated.

3. The structure defined in claim 2 in which there are two stop elements adjustable one to limit the sliding movement of said template in one direction at one terminal of traveling movement, and the other adjustable to limit the sliding movement of said template in the opposite direction at the limit of the traveling movement in the other direction.

4. In a machine of the kind described, a relatively fixed working support, a carriage equipped with a cutting tool, a motor with connections for imparting traveling movements to said carriage, a second motor with connections for imparting tracer movements to said carriage, a template mounted to move the said carriage, and electromagnetic controlling means for the tracer actuating motor, including a tracer subject to the action of the said template, in further combination with means for imparting a limited shifting movement to said template in respect to said carriage, to compensate for lag and play.

5. In a machine of the kind described, a relatively fixed work support, a supporting frame, a horizontal guide rail mounted for vertical movements on said frame, a carriage mounted to travel on said rail, a cutting tool on said carriage, a template mounted to travel with said carriage, an electric motor having connections for imparting traveling movements to said carriage, a motor having connections for imparting vertical movements to said rail and the carriage mounted thereon, and a controller for one of said motors including a relatively local tracer arranged to be acted upon by said template under traveling movements of said carriage, in further combination with means for shifting the position of said template in respect to said carriage to compensate for lag in the power transmission mechanism.

JOHN P. ELLENBECKER.